United States Patent [19]

Miyamoto et al.

[11] Patent Number: 5,852,648
[45] Date of Patent: Dec. 22, 1998

[54] IMAGE SIGNAL PROCESSING METHOD AND IMAGE SIGNAL PROCESSING DEVICE

[75] Inventors: Yoshihiro Miyamoto; Masaji Dohi, both of Kawasaki, Japan

[73] Assignee: Fujitsu Ltd., Kawasaki, Japan

[21] Appl. No.: 848,727

[22] Filed: May 22, 1997

[30] Foreign Application Priority Data

Dec. 26, 1996 [JP] Japan ..................... 8-357012

[51] Int. Cl.⁶ .................................. G01N 23/04
[52] U.S. Cl. ..................... 378/62; 382/169; 382/251; 382/274; 256/330
[58] Field of Search ..................... 382/169, 251, 382/252, 253, 274; 378/62, 98; 250/330

[56] References Cited

U.S. PATENT DOCUMENTS

| | | | |
|---|---|---|---|
| 4,754,332 | 6/1988 | Bergquist | 358/168 |
| 5,450,502 | 9/1995 | Eschbach et al. | 382/169 |
| 5,644,661 | 7/1997 | Smith et al. | 382/300 |
| 5,724,456 | 3/1998 | Boyack et al. | 382/274 |

*Primary Examiner*—David P. Porta
*Assistant Examiner*—David Vernon Bruce
*Attorney, Agent, or Firm*—Staas & Halsey

[57] ABSTRACT

A display signal of high contrast is generated by processing an image signal that is acquired from a camera such as an infra-red or X-ray camera. The method involves: dividing a screen into polygons, finding signal intensities of pixels in these polygons by interpolation from the original image signal intensities of pixels corresponding to the vertices of these polygons as a signal intensity LF of a low frequency component; finding the signal intensities HF of high frequency components of these pixels by performing calculation to subtract the signal LF of this low frequency component from the original image signal S at each pixel; finding, for the signal intensities HF of these high frequency components, from a histogram showing the rate of occurrence numbers of the respective signal intensities, a transformation function IHS including the integrated values of these rate of occurrence numbers up to respective signal intensities; transforming the signal intensities of the high frequency components HF into display signal intensities DHF in accordance with this transformation function IHS; and finding the display signal DP of these pixels by adding to the display signals DHF of these high frequency components obtained by this transformation a signal obtained by multiplying the signal of the low frequency component LF by a weighting coefficient β of less than 1.

11 Claims, 16 Drawing Sheets

ORIGINAL IMAGE

HIGH FREQUENCY IMAGE

HIGH FREQUENCY + 1/4 LOW FREQUENCY

LOW FREQUENCY IMAGE (a) $N=\infty$  $\beta=0$ (b) $N=100$  $\beta=1/4$ (c) N = 50    $\beta = 1/2$ (d) N = 1    $\beta = 1$

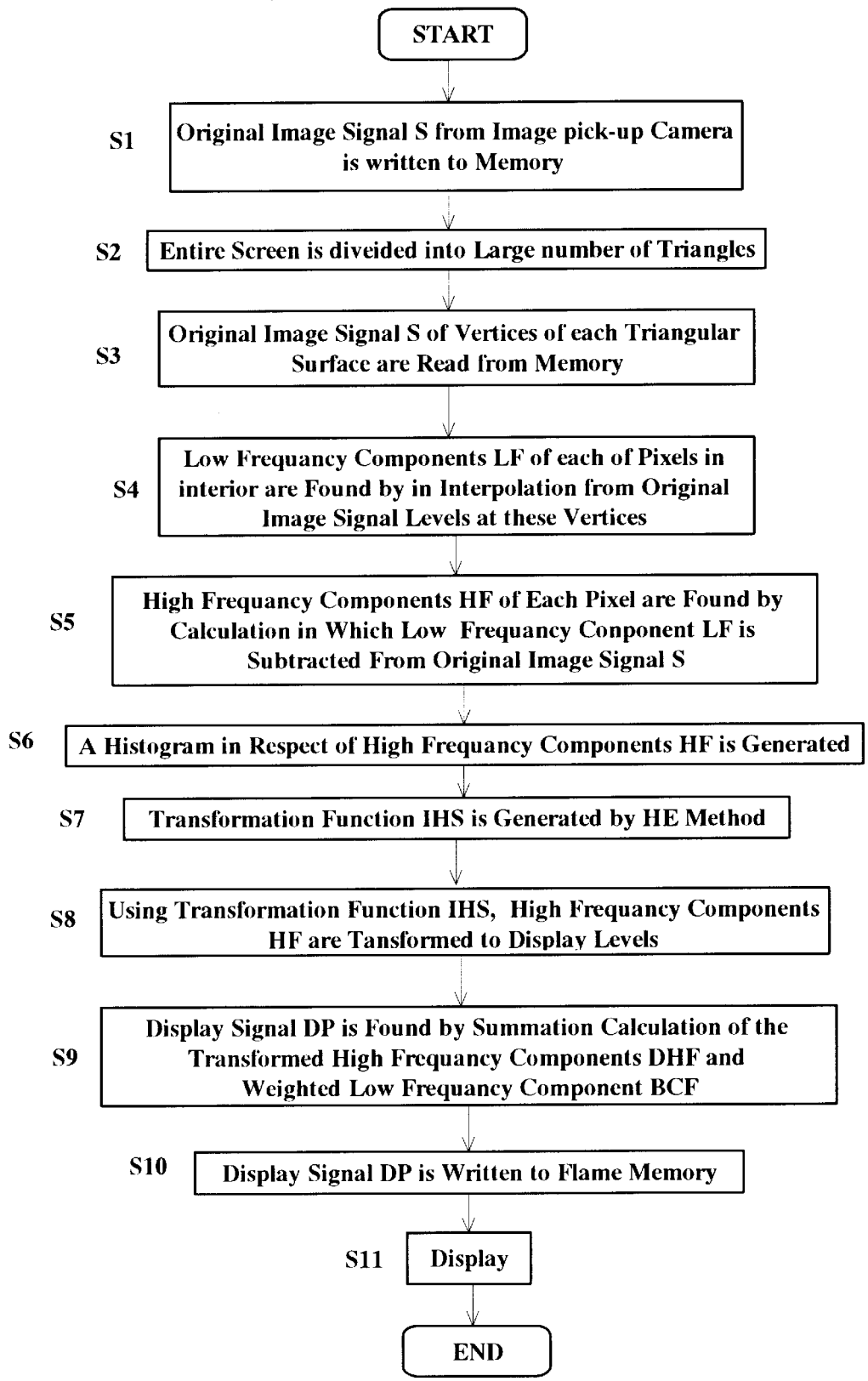

IMAGE SIGNAL PROCESSING METHOD AND IMAGE SIGNAL PROCESSING DEVICE

BACKGROUND OF THE INVENTION

1. Field of Invention

The present invention relates to an image signal processing method and image signal processing device whereby a low-contrast image signal from for example an infrared camera, X-ray camera or endoscope can be displayed more clearly.

2. Description of the Related Art

Image signals picked up by infrared cameras in darkness etc. and image signals picked up by X-ray cameras with X-rays etc. have a very wide dynamic range at the pick-up element; thus, if they are displayed, without modification, by a CRT display device or the like having only ordinary gradation capability, their contrast cannot be fully represented. For example, an infrared detection device provides gradation corresponding to 16 bits. This is because the detection signal corresponding to temperature that has an intensity distribution of extremely wide range is extracted. For comparison, in the case of visible light, the gradation is only about 8 bits (256 gradations). In fact, an ordinary CRT display device cannot display more than 256 gradations.

Consequently, if the original image signal detected by an infrared camera or the like is simply displayed in accordance with its intensity on a display device such as a CRT with which only a low degree of gradation can be displayed, images of very low contrast are obtained.

Consequently, methods of raising contrast have previously been developed by applying some sort of signal processing to the image signal. An example is the method in which a histogram is generated showing the relationship between the signal intensity of the original image signal and the rate of occurrence of this intensity in a single frame, each signal level at which there is at least one pixel counting as 1; the function indicating the relationship between signal level and count number is used as a transformation function, which is used to transform the original image signal levels to display signal levels. This method is called the histogram projection (HP) method.

Another method is the histogram equalization (HE) method, in which a histogram is generated in the same way, but the number of pixels at each signal level is simply counted (integrated), and the function indicating the relationship between this signal level and the count is used as the transformation function. A further method is the plateau equalization (PE) method, which represents a compromise between the histogram projection method and histogram equivalence method. In the plateau (flattening) equalization method, a histogram is generated as above, and the number of pixels at each signal level is counted up to a fixed upper limit, and the function indicating the relationship this signal level and the count is used as the transformation function.

All the above methods are disclosed in for example SPIE 2020 Infrared Technology XIX (1993) pages 440–450 (SPIE Vol. 2020 Infrared Technology XIX (1993) pp. 440–450).

Each of these methods is based on the concept of allocating a larger number of display levels (gradations) to signal levels of high rate of pixel occurrence, according to the rates of pixel occurrence for each signal level of the original image signal picked up by an infrared camera or the like that has a wide dynamic range with a large number of gradations. In this way, highest-possible contrast is sought to be achieved within the dynamic range of the display device.

However, the result of these image signal processing methods is that pixels of the original image signal whose absolute level is low are displayed dark, while pixels of higher level are still displayed bright, so that images of sufficient contrast cannot be displayed on the display device.

SUMMARY OF THE INVENTION

An object of the present invention is therefore to provide an image signal processing method and processing device whereby it is possible to display an image signal of wide dynamic range obtained from a means for image pick-up such as an infrared camera or X-ray camera on a display device of narrower dynamic range than this, with good contrast.

A further object of the present invention is to provide an image signal processing method and processing device whereby processing can be performed using a simpler algorithm and fewer memory accesses.

Yet a further object of the present invention is to provide an image signal processing method and processing device whereby the observer of the image can suitably select a parameter such as to cope with images of various types.

In an image signal processing method wherein a display signal is generated from an original image signal acquired from means for image pickup, this object is achieved, according to the present invention by providing an image signal processing method comprising: a step of dividing a screen into a plurality of polygons, finding signal intensities of pixels in the polygons by interpolation from the original image signal intensities of pixels corresponding to the vertices of these polygons, as a signal intensity of a low frequency component; a step of finding the signal intensities of high frequency components of the pixels by performing calculation to subtract the signal of the low frequency component from the original image signal at each pixel; a step of finding the display signal of the pixels by adding to the signal of the high frequency components a signal obtained by multiplying the signal of the low frequency component by a weighting coefficient of less than 1; and a step of displaying images on a display device in accordance with the display signal.

Further in an image signal processing method wherein a display signal is generated from an original image signal acquired from means for image pickup, this object is achieved, according to the present invention by providing an image signal processing method comprising: a step of dividing a screen into a plurality of polygons, finding signal intensities of pixels in the polygons by interpolation from the original image signal intensities of pixels corresponding to the vertices of these polygons, as a signal intensity of a low frequency component; a step of finding the signal intensities of high frequency components of the pixels by performing calculation to subtract the signal of this low frequency component from the original image signal at each pixel; a step of finding, for the signal intensities of the high frequency components, from a histogram showing the rate of occurrence numbers of the respective signal intensities, a transformation function including the integrated values of these rate of occurrence numbers up to the respective signal intensities; a step of transforming the signal intensities of the high frequency components into display signal intensities in accordance with this transformation function; a step of finding the display signal of the pixels by adding to the display signals of the high frequency components obtained by the transformation a signal obtained by multiplying the signal of the low frequency component by a weighting coefficient of less than 1; and a step of displaying images on a display device in accordance with the display signal.

The above objects are also achieved by the provision of an image signal processing device having an image signal processing unit that executes the above image signal processing methods.

BRIEF DESCRIPTION OF THE DRAWING

FIG. 24 is a flowchart of image signal processing for displaying 1 flame.

DESCRIPTION OF THE PREFERRED EMBODIMENT

Embodiments of the present invention are described below with reference to the drawings. However, the scope of the present invention is not restricted to these embodiments.

[Principles of the present invention]

Figure 1:
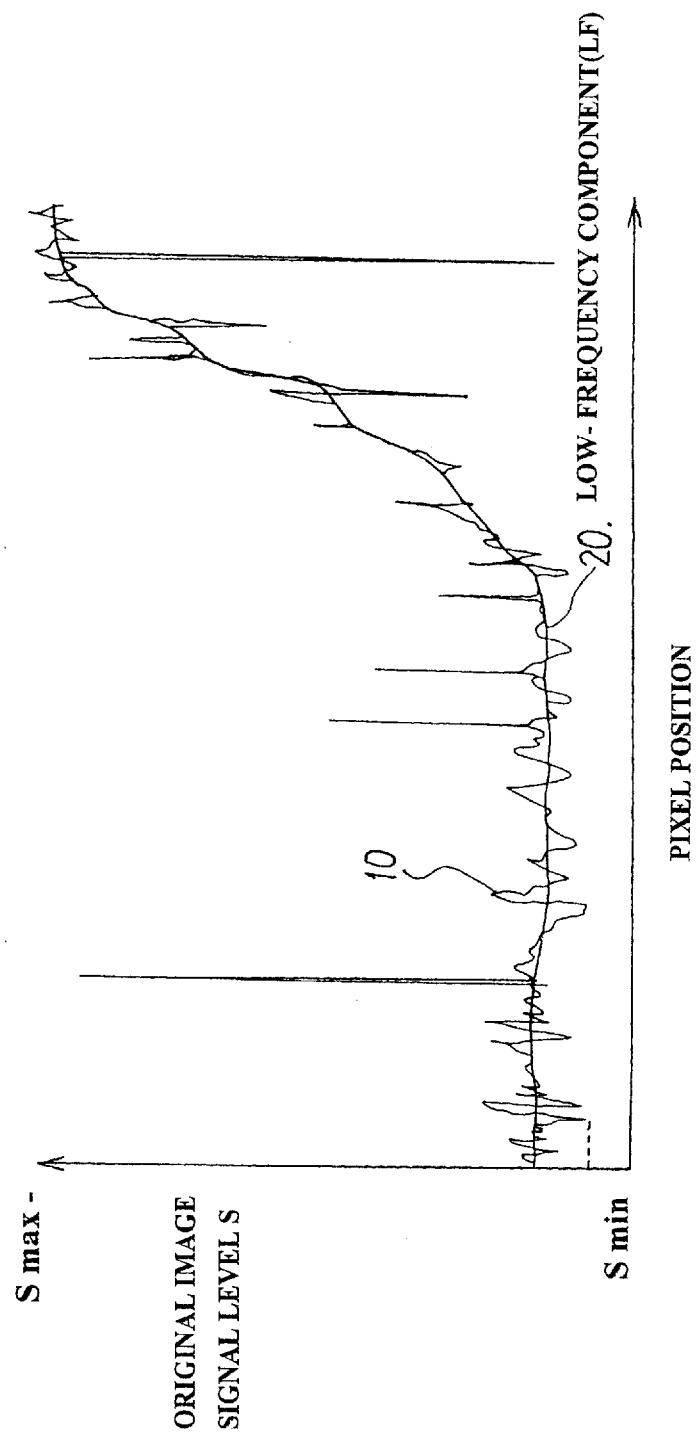
FIG. 1 is a graph showing the relationship between pixel position (horizontal axis) in a given frame and original image signal level (vertical axis)

FIG. 1 is an example of a graph showing the relationship between pixel position (horizontal axis) within a given frame and original image signal level S (vertical axis). As shown at 20 in the Figure, the spatial frequency of the original image signal 10 shows a large scale gentle fluctuation of signal level with respect to pixel position. This large scale gentle fluctuation is the low-frequency component. The fine signal level changes that are superimposed on this gentle fluctuation are the high frequency components.

As described above, with the conventional system, in which the lowest signal level is assigned to the lowest display level and the highest signal level is assigned to the highest display level, display cannot be effected on a display device with sufficient contrast simply by allocating display level gradations as far as possible to image signal levels of high rate of occurrence.

In the present invention, the low-frequency component shown in FIG. 1 is extracted from the spatial frequency of the original image signal, and the high frequency component is extracted by removing this low frequency component from the original image signal. A signal obtained by adding to this high frequency component the low frequency component weighted with a prescribed weighting of less than 1 is then taken as the display signal. That is, in the present invention, the display signal is generated by emphasising the high frequency component in the spatial frequencies of the original image signal, in order to raise contrast.

Furthermore, with the present invention, a histogram of these high frequency components is generated and these high frequency components are transformed in accordance with a transformation function formed by the HE method or PE method described above; these transformed high frequency components then are added to a component obtained by suitably selected weighting to the low frequency component, to obtain a signal that is taken as the display signal. By doing this, the signal of the high frequency components can be distributed practically uniformly in the dynamic range of the display signal level, thereby enabling contrast to be improved.

Regarding the method of extracting the low frequency component from the spatial frequency components of the original image signal, generally the moving average method is used, but, in the present invention, this is generated more efficiently by an algorithm that enables this low frequency component to be extracted in a simple fashion. This aspect is described in detail later.

Figure 2:
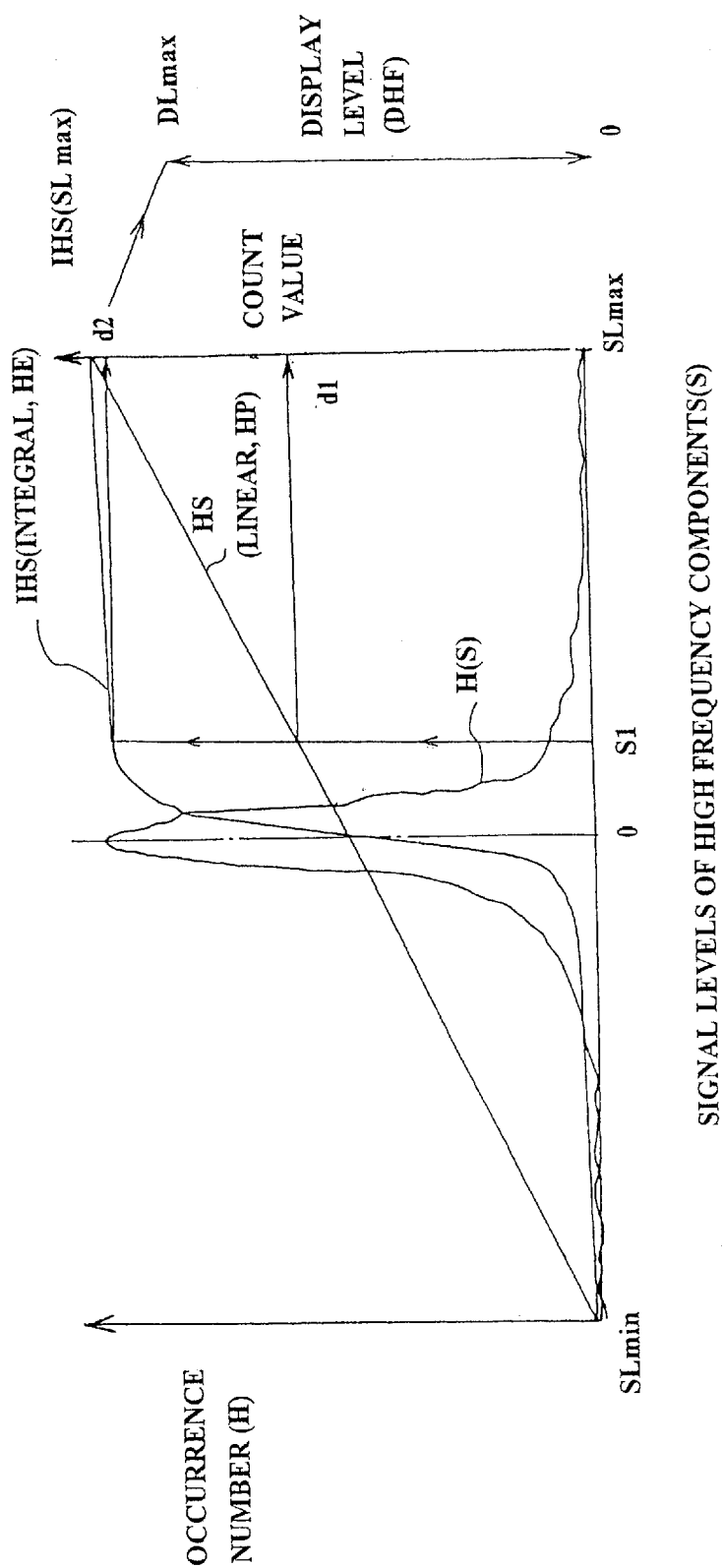
FIG. 2 is a graph showing a histogram of high frequency components extracted from the spatial frequencies of the original image signal, and transformation functions obtained by the HP (histogram projection) method and HE (histogram equalization) method.

FIG. 2 is an example of a graph showing a histogram H(s) of high frequency component extracted from the spatial frequency of the original image signal and the transformation functions HS, IHS obtained by the HP (histogram projection) method and HE (histogram equalization) method. The horizontal axis shows the signal level, while the vertical axis shows the rate of occurrence (number) of pixels having the respective signal level, and the count value when this rate of occurrence is counted by the HP method and HE method.

First of all, H(s) in FIG. 2 is a histogram of the high frequency components. In more detail, as shown in FIG. 1, the large scale gentle fluctuation of the original image signal is the low frequency component, so if this low frequency component LF is removed from the original image signal S, the remaining high frequency components HF have a vertical plus/minus signal level centred on the low frequency component. Consequently, the histogram H(s) of the high frequency components is distributed on the left and the right, centred on signal level 0.

Consequently, if, for this histogram H(s), rate of occurrence is counted by the HP method, in which the case where even a single pixel exists at a given signal level means that this is counted as one, a practically linear function is obtained as shown by HS in the drawing. In this example, the histogram H(s) has long tails to the left and right, so the function of count value is also a linear function extending over the entire range of signal level.

In contrast, if, for histogram H(s), the rate of occurrence is counted in accordance with the HE method, in which the number of pixels (rate of occurrence) at each signal level is simply counted (integrated), as shown at IHS in the Figure, a function is obtained in which the histogram H(s) is simply integrated. In this function, regions where the rate of occurrence is high have a large gradient, while regions where the rate of occurrence is low have a small gradient.

Accordingly, using either this function HS or IHS as transformation function, a signal level S in the range from SLmin to SLmax is transformed to a display level DHF in the range from 0 to DLmax. In more detail, a signal level sl in the drawing, when transformed, gives a display level d1 or d2 respectively. It will be understood that in the HP system gradations of display level are only allocated in respect of existing image signal levels. And in the case of the transformation function IHS of the HE method, it will be understood that more gradations of display level are allocated to regions having a higher rate of occurrence.

The inventors have found that if transformation is effected by the simple linear function of the HP method, it is often impossible to increase the contrast. The reason for this is that, as shown in FIG. 2, in images of the natural world, even the histogram H(s) of the high frequency components has long tails to left and right, so that the linear function also extends from the minimum value SLmin to the maximum value SLmax of the signal level, reaching, in the worst case, 2(Smax−Smin). If therefore the integrated value of the histogram in accordance with the HE method is used for the transformation function, an enormous improvement in contrast can be obtained.

Figure 3:
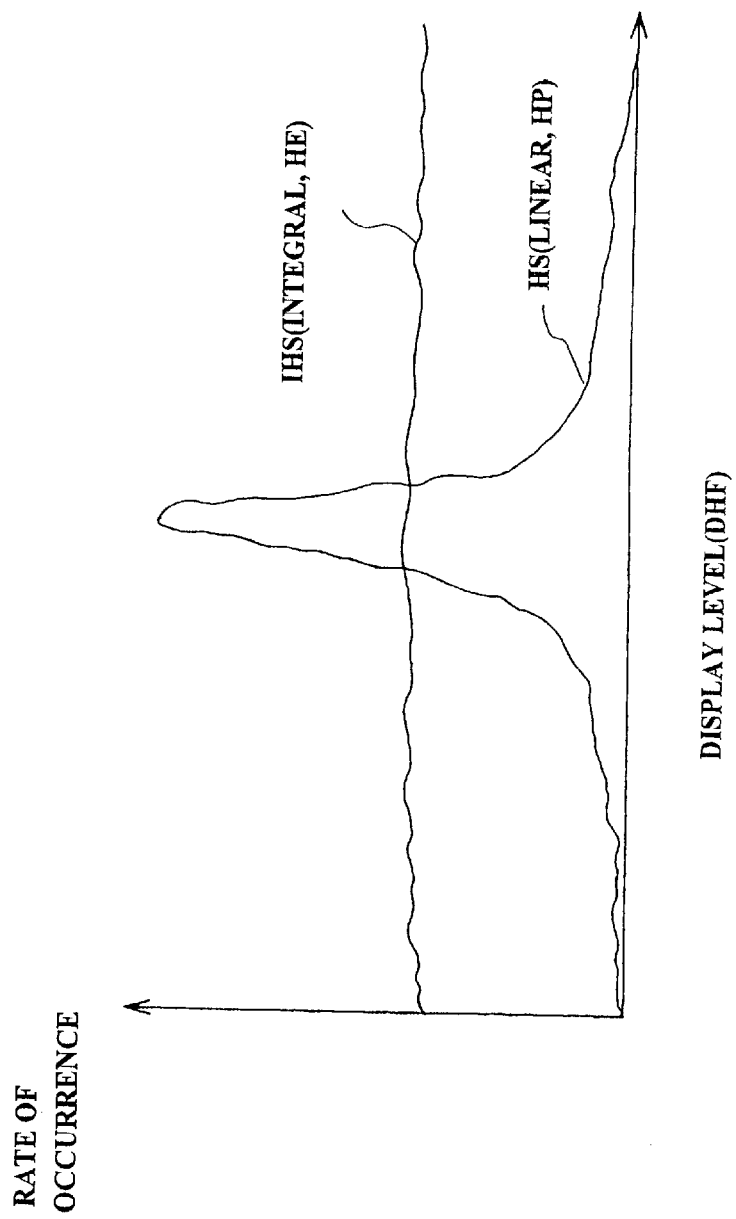
FIG. 3 is a diagram of a histogram showing the transformed display levels and their rate of occurrence.
Figure 4:
FIG. 4 is an image obtained by reproducing an example of an original image on a display.

FIG. 3 is a histogram showing the display levels obtained by the above conversion, and their rate of occurrence. It is clear from this Figure that if the integrated value IHS obtained by the HE method is employed as the transformation function, the rate of occurrence becomes practically constant with respect to display level. This means that contrast can be raised by effectively employing a restricted range of display levels. In contrast, if the linear function HS of the HP method is employed as the transformation function, high rates of occurrence are obtained in a narrow range of display levels, just as they were before transformation.

Figure 7:
FIG. 7 is an image obtained by reproducing on the display an image displaying only low frequency components.

For reference, in FIG. 4, 5, 6 and 7 there are shown an example original image (FIG. 4), an image obtained by displaying with transformed display levels in respect of the high frequency components only (FIG. 5), an image obtained by adding to the transformed high frequency component display levels the low frequency component with a weighting of ¼ (FIG. 6), and an image displaying only the low-frequency component (FIG. 7).

Compared with the example (FIG. 4) of the original image, the example using only the high frequency components (FIG. 5) shows higher contrast, and the contrast of details is emphasised. However, this image using high frequency components only is unnatural to some extent, in that the right of the screen, which is a bright region, and the left of the screen, which is a dark region, appear with about the same degree of brightness. Consequently, in this case, by adding to the high frequency components a low frequency component that has been attenuated by applying a suitable weighting to the low frequency component, as in FIG. 6, the right side of the screen is given greater overall brightness than the left side and furthermore contrast in the respective regions is emphasised.

Figure 5:
FIG. 5 is an image obtained when only high frequency components are reproduced on a display, display being effected with transformed display levels.
Figure 6:
FIG. 6 is an image obtained by reproducing on the display an image obtained by adding a weighting of ¼ of the low-frequency components to the display level of the high frequency components transformed as in FIG. 5.
Figure 8:
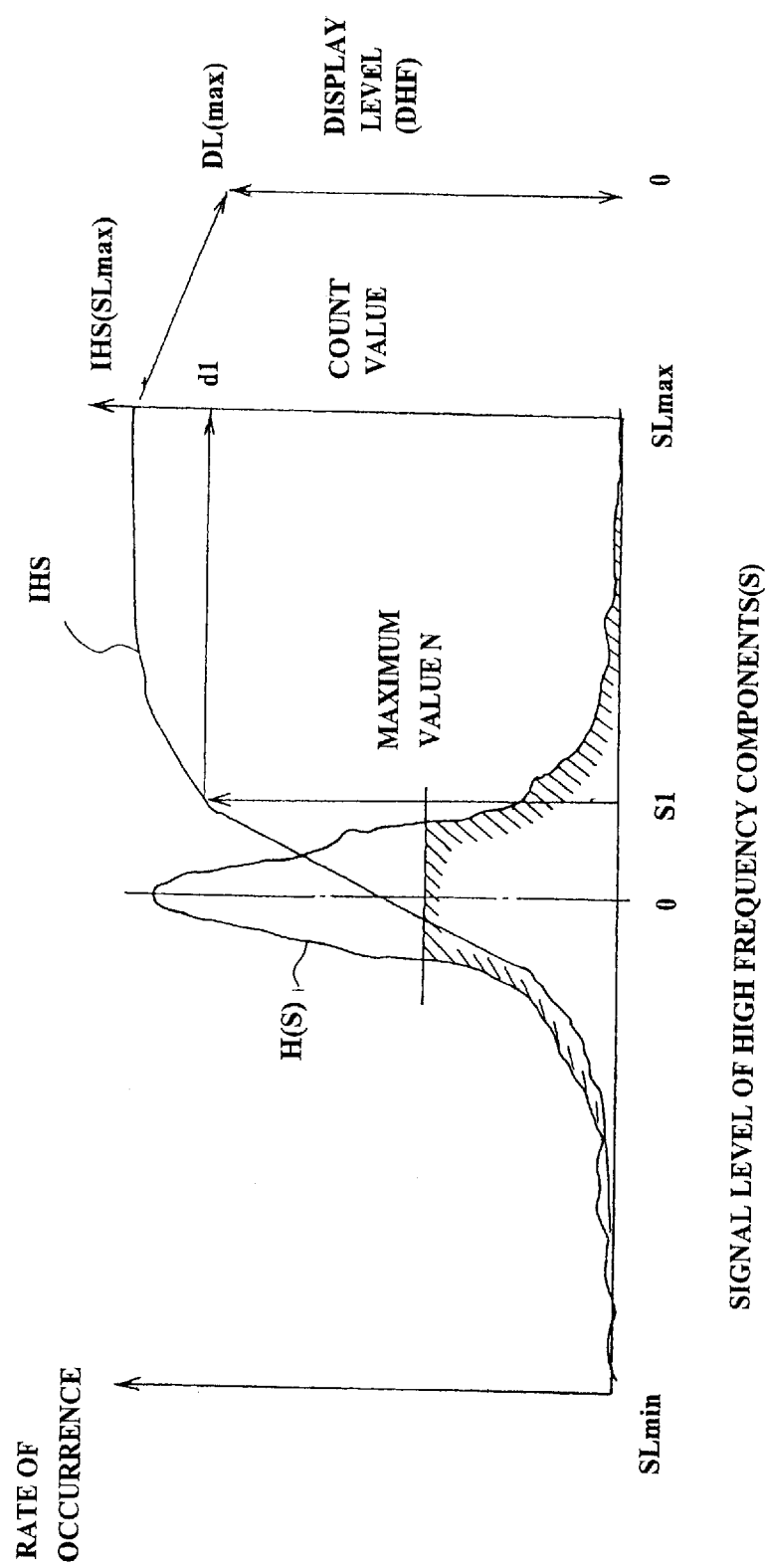
FIG. 8 is a graph showing a histogram of high frequency components extracted from the spatial frequency of the original image signal and a transformation function obtained by the PE (plateau equalization) method.

FIG. 8 is an example of a graph showing a histogram H(s) of the high frequency components extracted from the spatial frequencies of an original image signal, and a transformation function IHS obtained by the PE (plateau equalization) method. In this example also, HS(s) is a histogram of the high frequency components. In the plateau equalization method, instead of taking the integrated value of histogram HS(s), the maximum value N of the rate of occurrence at each signal level is given a prescribed value, and any higher rates of occurrence are counted using this maximum rate of occurrence value at that signal level as the rate of occurrence in question. In this plateau equalization method, the integrated values of rate of occurrence shown by the shading in FIG. 5 give a transformation function IHS.

This makes it possible to avoid excessive emphasis of the peak region in cases where the peak value of the histogram H(s) is extremely high.

In transforming these high frequency components to display levels using the plateau equalization method, by suitably setting the maximum rate of occurrence N referred to above, if N=infinity, the HE (histogram equalization) method is obtained; if N=M (where M is an integer of 2 or more), the PE (plateau equalization) method is obtained, and if N=1 the HP (histogram projection) method is obtained.

The principles of the present invention as above may be summarised as follows. Firstly, the spatial frequencies of an original image signal S of large dynamic range are divided into high frequency components HF and a low frequency component LF. The low frequency component is multiplied by a weighting coefficient $\beta$ of less than 1, and added to the high frequency components HF; this constitutes the basic signal processing. Specifically, the display signal DP is as follows:

$S = HF + LF$ $DP = HF + \beta LF$

It should be noted that, in this first signal processing step, it would be possible to further separate the original image signal into high frequency components HF, intermediate frequency components MF, and low frequency components LF, multiplying the intermediate frequency components and low frequency components by respective coefficients $\gamma$ and $\beta$ of less than 1 and then adding. In this case, the display signal DP is as follows.

$$S = HF + LF + MF$$

$$DP = HF + \beta LF + \gamma MF$$

In a second signal processing step, a histogram is generated for the high frequency components HF, and the function obtained by counting the rates of occurrence for each signal level, the maximum rate of occurrence however being limited to N, is used as the transformation function, and the original image signal levels are transformed to display signal levels DHF using this function. The low-frequency components, weighted by $\beta$, are then added to these transformed high frequency components. The calculation formulae for finding the display signal DP (j,k) at a pixel (j,k) are then as follows:

$$HF(j,k) = S(j,k) - LF(j,k)$$

$$DHF(j,k) = DLmax * IHS(HF(j,k))/IHS(SLmax)$$

$$DP(j,k) = (1-\beta) * DHF(j,k) + \beta LF(j,k)$$

Also, as shown in FIG. 3 or FIG. 8, DLmax is the maximum display level and SLmax is the maximum value of the signal level on the horizontal axis, so IHS(SLmax) is the maximum integrated value of the transformation function.

The third signal processing step is to perform processing whereby it is possible to suitably alter and set the maximum rate of occurrence N and weighting coefficients $\beta$ or $\gamma$ in the second processing step described above. This is performed as shown in the Table below.

TABLE 1

| No. | Transformation Method | Maximum Occurrence N | Weighting Coefficient $\beta$ | Image Example |
|---|---|---|---|---|
| 1 | HP | N = 1 | $\beta < 1$ ($\beta = 1$) | (d) |
| 2 | HE | N > 1 (N = 50) | $\beta < 1$ ($\beta = \frac{1}{2}$) | (c) |
|   |    | (N = 100) | ($\beta = \frac{1}{4}$) | (b) |
| 3 | PE | N = $\infty$ | $\beta < 1$ ($\beta = 0$) | (a) |
| 4 | No transformation | — | $\beta < 1$ | — |
| 5 | No transformation | — | $\beta = 1$ | Original |

Figure 9:
FIG. 9 is an image obtained by reproducing on the display image example (a) in a table.

Example images (a), (b), (c) and (d) shown in the above Table are shown in FIG. 9, FIG. 10, FIG. 11 and FIG. 12. Number 5 in the above Table is an example (FIG. 4) in which the original image is displayed on the display device without modification. Number 4 corresponds to the first signal processing step described above, and represents a method in which the low frequency components are weighted and added to the high frequency components without performing the transformation using the count function of the histogram. This example is not shown in the Figures. Further, number 3 is an example in which transformed display levels DHF of the high frequency components are generated by a transformation method of the PE type, in which the maximum rate of occurrence N is allowed to be infinitely large, the weighted low frequency components being added thereto. FIG. 9 is image example (a) showing the transformed display level DHF of the high frequency components, taking weighting coefficient $\beta = 0$.

Figure 10:
FIG. 10 is an image obtained by reproducing on a display example image (b) in a table.
Figure 11:
FIG. 11 is image obtained by reproducing on a display example image (c) in the table.

Number 2 is an example in which the transformed display levels DHF transformed using the HE method in the case where the maximum rate of occurrence N is chosen as an integer of 2 or more are added to weighted low frequency components $\beta LF$. FIG. 10 shows image (b) in the case where $\beta = \frac{1}{4}$ and FIG. 11 shows example image (c) in the case where $\beta = \frac{1}{2}$, respectively.

Figure 12:
FIG. 12 is image obtained by reproducing on a display example image (d) in the table.

Number 1 is an example in which transformed display levels DHF obtained by transforming using the HP method in which the maximum rate of occurrence N is deemed to be 1 are added to weighted low frequency components $\beta LF$. FIG. 12 shows in particular an example image (d) when $\beta = 1$.

As described above, the basic signal processing comprises transforming the high frequency components using a histogram count function IHS to produce transformed display levels DHF, multiplying the low frequency components by a weighting coefficient $\beta$ and adding these two; by suitably selecting the maximum rate of occurrence N and weighting function $\beta$, the signal processing of number 1, 2, or 3 of the Table can be performed.

Also, if the maximum rate of occurrence is made N=1, this is almost equivalent to the case where no transformation is performed, as in HS of FIG. 3, as described above; thus numbers 5 and 1 of the above Table may give practically the similar results.

[Image signal processing device]

Figure 13:
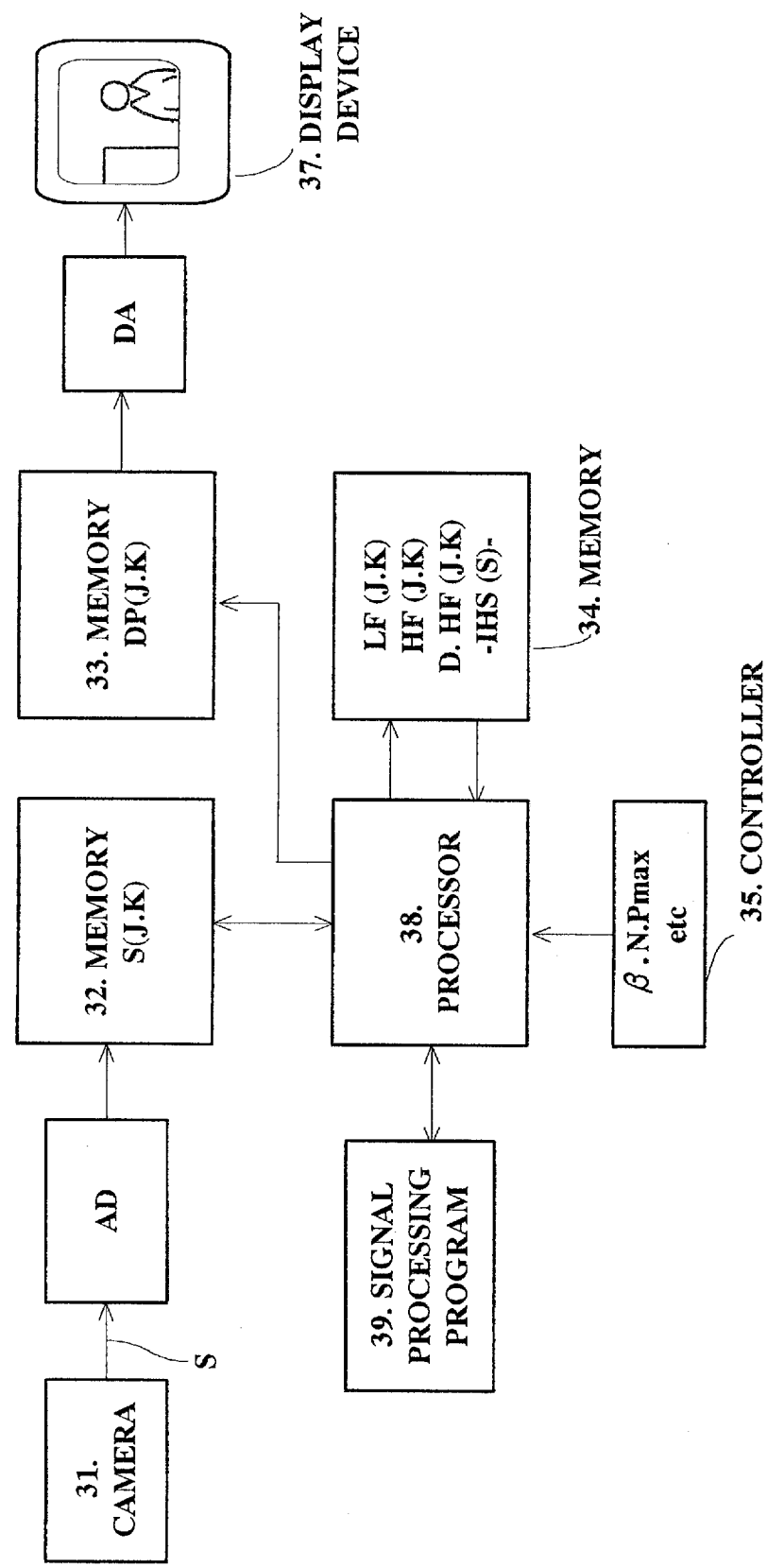
FIG. 13 is a block diagram of a signal processing device for an image signal.

FIG. 13 is a block diagram of a signal processing device for the above image signals. 31 is for example an infrared or X-ray camera; the analog original image signal that is picked up is transformed to a digital signal by analog/digital converter AD, and is temporarily written to memory 32. 38 is a signal processing device incorporating a customised ROM in which is stored the calculation program, and which may be for example a digital signal processor. If a general-purpose processor is employed, the signal processing described above is performed in accordance with a signal processing program for calculation stored in memory 39.

Memory 34 stores the low frequency components LF extracted from the original image signal S, the high frequency components HF generated by removing the low frequency components LF from the original image signal S, a transformation function IHS of the count values of the rates of occurrence of the histogram, and a transformed display signal DHF of the high frequency components transformed by this transformation function IHS. As already described, these calculations are all performed by processor 38. The display signal DP obtained by adding the transformed display signal DHF and the low frequency components LF weighted by $\beta$ is stored in memory 33. Specifically, memory 33 is a frame memory.

The display data in frame memory 33 is converted to analog values by digital/analog converter DA, and displayed on a display device 37 such as a CRT. Weighting coefficient $\beta$ and maximum rate of occurrence N etc. are suitably set by means of a controller 35. The operator can alter and set these values whilst observing the display screen.

[Curved surface or polyhedral division approximation method]

In the present invention, the low frequency components of the spatial frequencies in the original image signal are extracted and the high frequency components are obtained by subtracting these low frequency components from the original image signal. In order to regenerate the image signal on a display device, it is necessary to generate display data in the amount of 60 frames per second, for example. Typically the calculation to extract the low frequency components from the image signal is performed by calculating a moving average.

Figure 17:
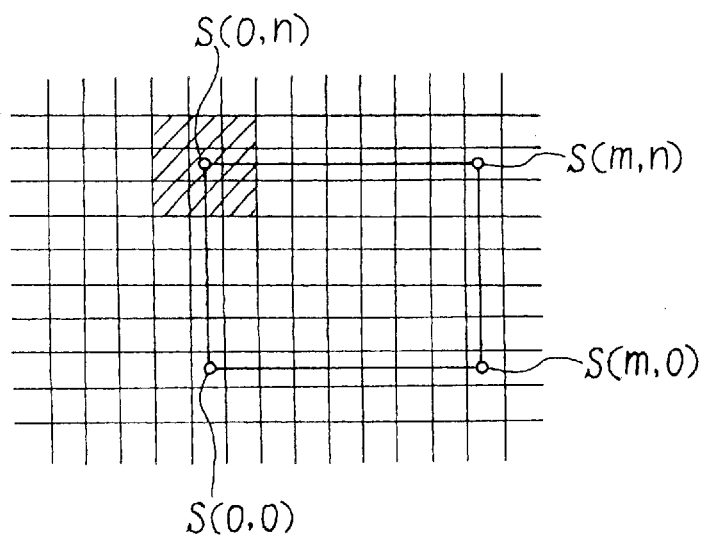
FIG. 17 is a view showing the relationship between the four vertices and pixels.

This moving average method is a method wherein for example the average value of the image signal levels of 25 pixels within a range of 5×5 pixels is supplied as the low frequency component of the pixel at the centre. Consequently, in order to calculate the low frequency component of a single pixel, it is necessary to execute the operation of reading from memory 32, in which the image signal levels are stored as shown in FIG. 17, 25 times. Furthermore, the operation of accessing memory 25 times in respect of each pixel represents a considerable load on processor 38, and, in the worst case, it may become impossible to generate 60 frames per second.

Accordingly, the present invention provides a method whereby the number of times of memory access for generating the low frequency component can be enormously reduced.

Figure 14:
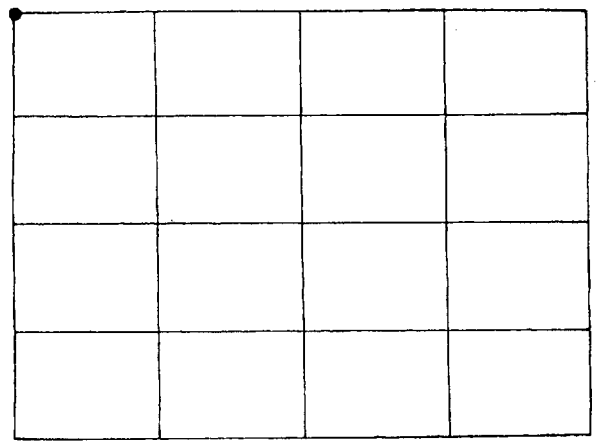
FIG. 14 is a view showing an example in which the display screen is divided into a plurality of tetragons for extraction of the low frequency components.
Figure 15:
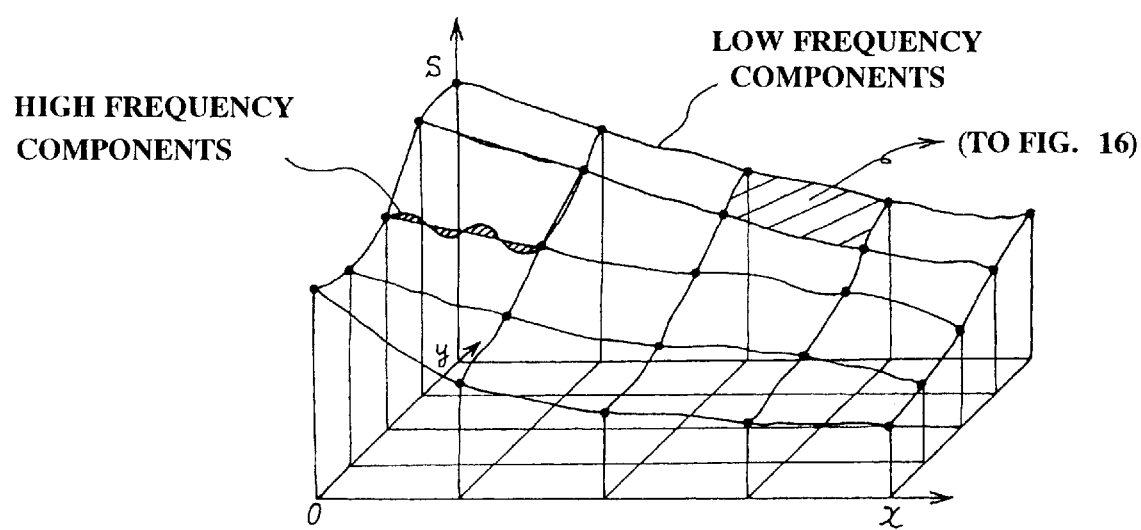
FIG. 15 is a diagram wherein the image signal levels at each vertex of the tetragons into which the screen is divided are plotted in the z axis direction.

FIG. 14 shows an example of the division of the display screen into a plurality of tetragons in order to extract the low frequency component. In this example, it is divided into 4×4, i.e. 16 tetragons. If the image signal level at each vertex is plotted along the Z axis direction and these vertices are joined by straight lines, a result for example as in FIG. 15 is obtained. As shown in this Figure, the straight lines connecting the resulting lattice are approximately the low frequency component LF, while the fine signals superimposed on this low frequency component LF are the high frequency components HF. Thus, the method of finding the high frequency components by dividing in this way with tetragon curved surfaces is called the curved surface division approximation method.

Figure 16:
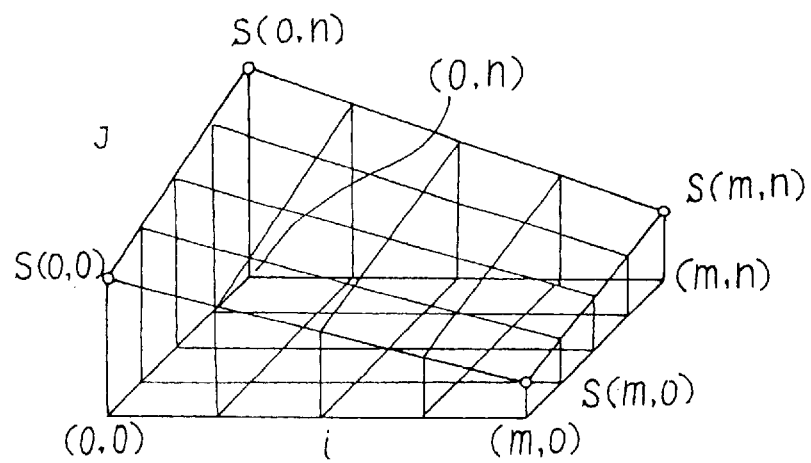
FIG. 16 is a view given in explanation of an interpolation calculation for one of the tetragons obtained by dividing the screen.

FIG. 16 is a view given in explanation of interpolation calculation in respect of a single tetragon obtained by the division process in FIG. 14. In this example, let the signal levels of the four vertices be respectively S (0, 0), s (0, n), S (m, 0), and s (m, n). The tetragon bounded by these four vertices contains (m+1)×(n+1) pixels. In order to find the low frequency components at each pixel, the signal levels of the low frequency components at the respective pixels can be found simply by interpolation from the signal levels at the four vertices.

In the above example, the signal level at a pixel (i,j) is as follows:

$$LF(i, j) = [S(0,0)*(m - i)*(n - j) + S(0, n)*(m - i)*j + S(m, 0)*i*(n - j) + S(m, n)*i*j]/m/n \quad (i = 0 \sim m, j = 0 \sim n)$$

In the case where the tetragon is a square, it contains (n+1)×(n+1) pixels.

FIG. 17 is a view showing the relationship of the four vertices and pixels. 7×9=63 pixels are contained within the vertices. In order to reduce the effects of noise and point light sources, as the signal levels at each vertex shown in FIG. 15 and FIG. 16, it is desirable to use for example the mean value of a plurality of pixels centred at each vertex. More specifically, in the case of the vertex S(0,n) shown in FIG. 17, the mean value of the image signal levels (intensities) at the 9 pixels indicated by the shading is employed as the signal level of vertex S(0, n).

For example, a formula for calculating the mean value of (2n+1)×(2n+1) pixels centred on a vertex is as follows:

$$C(j, k) = \sum_{j=-n}^{n} \sum_{k=-n}^{n} S(j, k)/(2n + 1)^2$$

It should be noted that the signal levels (intensities) at each vertex could be calculated from the original image signal levels in a single frame. Alternatively, as another method, because of considerations regarding the S/N ratio, the moving average value on the time axis obtained from a plurality of frames could be employed. The signal level C(j,k) at a vertex in this case is found by:

$$C(j, k) = \sum_{t=-n}^{0} S(j, k, t)/(n + 1)$$

This indicates the mean value of n+1 frames from time point t=−n to t=0. Using the moving average value on the time axis of a plurality of frames enables temporal noise to be removed.

Also, as another method, this extraction could be effected by integration of the original image signals from a plurality of frames multiplied by weighting coefficients $C^{-n}$ on the time axis. This weighting coefficient could for example be such as to be heaviest at the frame in question, but becoming lighter with increasing distance from this frame on the time axis. The signal level C(j,k) at a vertex is then given by:

$$C(j, k) = \sum_{t=-n}^{0} C^{-n} S(j, k, t) / \sum_{t=-n}^{0} C^{-n}$$

In this case also the S/N ratio is improved, because temporal noise is reduced.

In for example the case of an image that changes only gradually, the above calculation of signal level at the vertices and interpolation using these signal levels does not need to be performed for every frame; in fact, a sufficiently real-time display can be effected by updating for example every 0.2~0.5 seconds. In this case, the calculation load can be decreased.

In this curved surface division approximation method, in order to decrease discontinuity at the boundaries of the curved surface approximation, it is desirable to perform smoothing processing on the low-frequency component LF at the pixel points which is obtained by the approximation calculation. This smoothing processing may be performed by for example calculation to obtain the average value of the surrounding pixels. Specifically, a calculation formula to obtain the mean value of the low-frequency component LF of (2n+1)×(2n+1) pixels centred on the pixel in question is:

$$LF(j, k) = \sum_{j=-n}^{n} \sum_{k=-n}^{n} LF(j, k)/(2n + 1)^2$$

It should be noted that, for the above calculations, calculation processing can be performed at high speed by temporarily storing in for example a buffer the low frequency component of each pixel generated by a calculation process in a digital signal processor.

Figure 18:
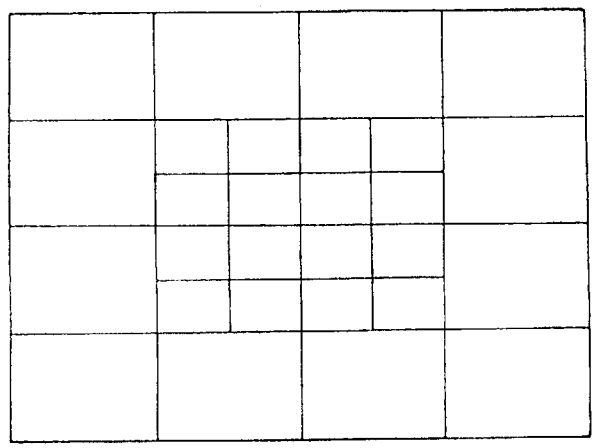
FIG. 18 is a view showing an example in which display can be effected with more natural gradation by raising the density of vertices in the central region of the screen so that higher frequencies can be accommodated.

FIG. 18 shows an example in which display can be effected with a natural gradation by raising the density of vertices in the central region of the screen, thereby enabling the low frequency to have higher frequency. In other words, in dividing the plane, it is not necessary to divide the screen equally.

In this division method, the whole surface of the screen is divided at for example several locations, and histograms are generated of the image signal in the respective regions. If a histogram has a wide range of distribution, this means a high rate of change of the image signal level (intensity), so the size of the areas of the regions obtained by this division should be set to a small value. And if the range of distribution of the histogram of a region is narrow, this means that the rate of change of the image signal level there is low, so the size of the area obtained by the division process can be set to a larger value. In other words, regions where the rate of change of image signal level is higher can be made to accommodate comparatively higher frequencies within the low frequency component. As a result, the low frequency component can be made to approximate more closely to the image signal level.

Figure 19:
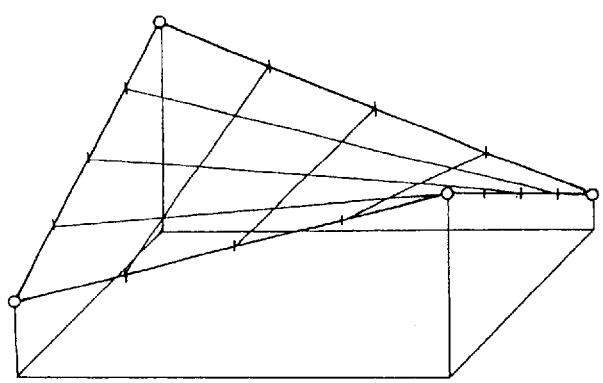
FIG. 19 is a view showing an example where the tetragons are distorted.

In a tetragonal curved surface division approximation, FIG. 19 shows a case where the tetragonal surface is distorted. Since such tetragons may have a distorted surface, when interpolation is performed by the above method, there may therefore be some loss of accuracy of the approximately calculated low frequency components.

Figure 20A:
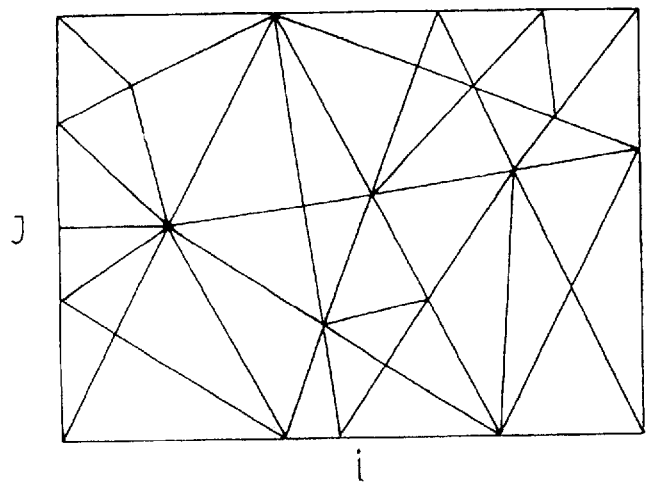
FIGS. 20A and 20B are views showing an example in which the screen is divided into triangles.
Figure 20B:
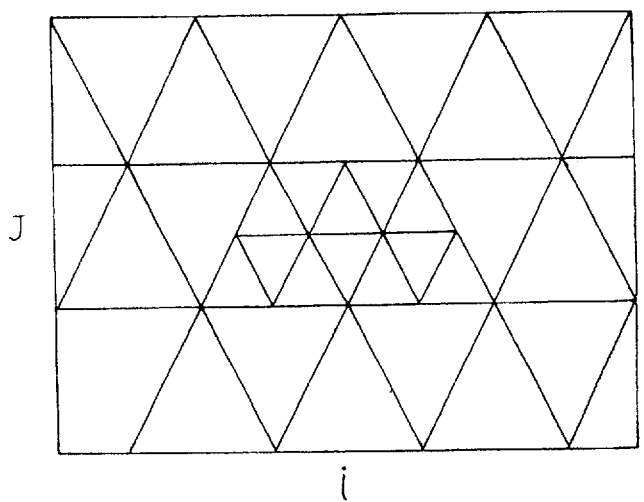
Figure 21:
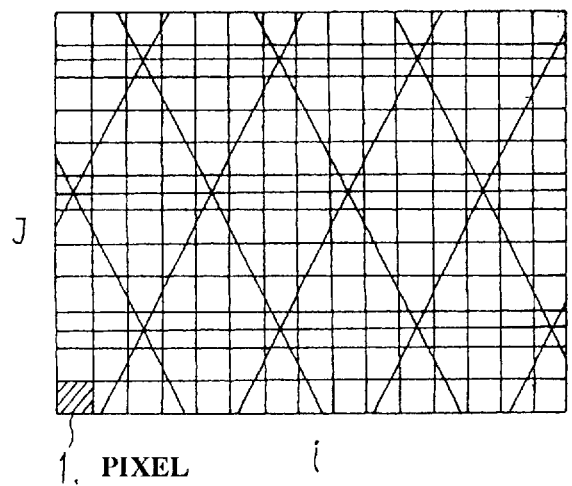
FIG. 21 is a view showing the relationship between pixels and vertices of triangles when division is effected into regular triangles.

Accordingly, in another method of surface division approximation according to the present invention, the screen may be divided into a large number of triangles. FIG. 20(A) and (B) show examples where the screen is divided into triangles. The example of FIG. 20(A) is a case where the screen is divided into triangles of different size, while the example of FIG. 20(B) is an example in which the screen is divided into regular triangles, the division being finer in the central region of the screen. FIG. 21 is a view showing the relationship between the vertices of the triangles and the pixels when division is effected into regular triangles.

When the screen is divided using triangles, the surfaces obtained by the division may be defined by planes. This is clear from the mathematical principle that a plane can be uniquely determined by three points. Thus, a method in which approximate calculation is effected by division into a large number of planes is called a multiple plane division approximation method.

Figure 22:
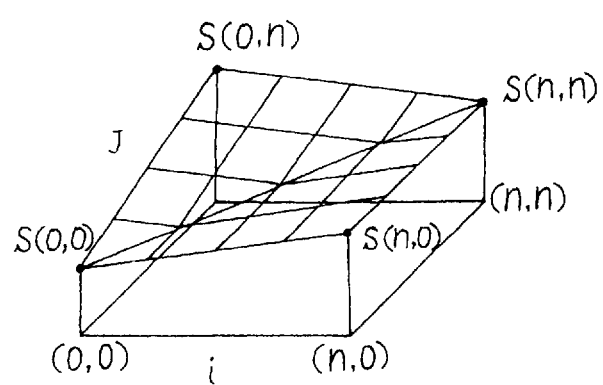
FIG. 22 is a view showing a case where the original image signal levels are applied on the Z axis, when the screen is distorted.

FIG. 22 is a diagram showing original image signal levels along the Z axis, for the case where a curved surface as in FIG. 19 is produced by tetragons. In this example, there are two triangles within vertices $(0, 0)$, $(0, n)$, $(n, 0)$, and $(n, n)$. If the image signal levels at each vertex are taken as: $S(0,0)$, $S(0,n)$, $S(n,0)$, and $S(n,n)$, the signal level of the internal pixels can be found by the following interpolation calculation. The signal levels that are thus found are approximate values of the signal level of the low frequency component.

Between vertices (0,0) and (n,n), i=j, and
LF(i,j)=[S(n,n)−S(0,0)]*i,n+S(0,0)
Between vertices (0,0) and (n,0), j=0, and
LF(i,0)=[S(n,0)−S(0,0)]*i/n+s(0,0) and
Between vertices (0,0) and (0,n), i=0, and
LF (0,j)=[S(0,n)−S(0,0)]* j/n+S(0,0)

Consequently, the pixel in the middle of the triangle of vertices (0,0), (n,0), (n,n) is:

$$LF(i,j)=[LF(i,i)-LF(i,0)]*j/i+LF(i,0)$$

and the pixel in the middle of the triangle of vertices (0,0), (0,n), (n,n) is:

$$LF(i,j)=[LF(j,j)-LF(0,j)]* i/j+LF(0,j)$$

So the signal level at each pixel can be found by interpolation by performing the five calculations described above.

As described above in connection with the curved surface division approximation using tetragons, methods available for finding the image signal level at each vertex include: finding the signal level within a single frame, taking the moving average of a plurality of frames on the time axis, and applying weighting coefficients.

As described above, with the present invention, in order to find the signal level of the low frequency component at each pixel, a signal level from which the high frequency components have been cut out can be automatically found by dividing the interior of the screen into a plurality of surfaces (curved surface or flat surfaces), and finding the signal level of the pixel by the method of interpolation from the original image signal level at the vertices of this surface. It is therefore not necessary to read from memory 32 all the original image signal levels for each pixel. The low frequency component can thus be automatically found simply by performing the above interpolation calculation from the original image signal levels at the vertices; the calculation load can thereby be lightened.

Figure 23A:
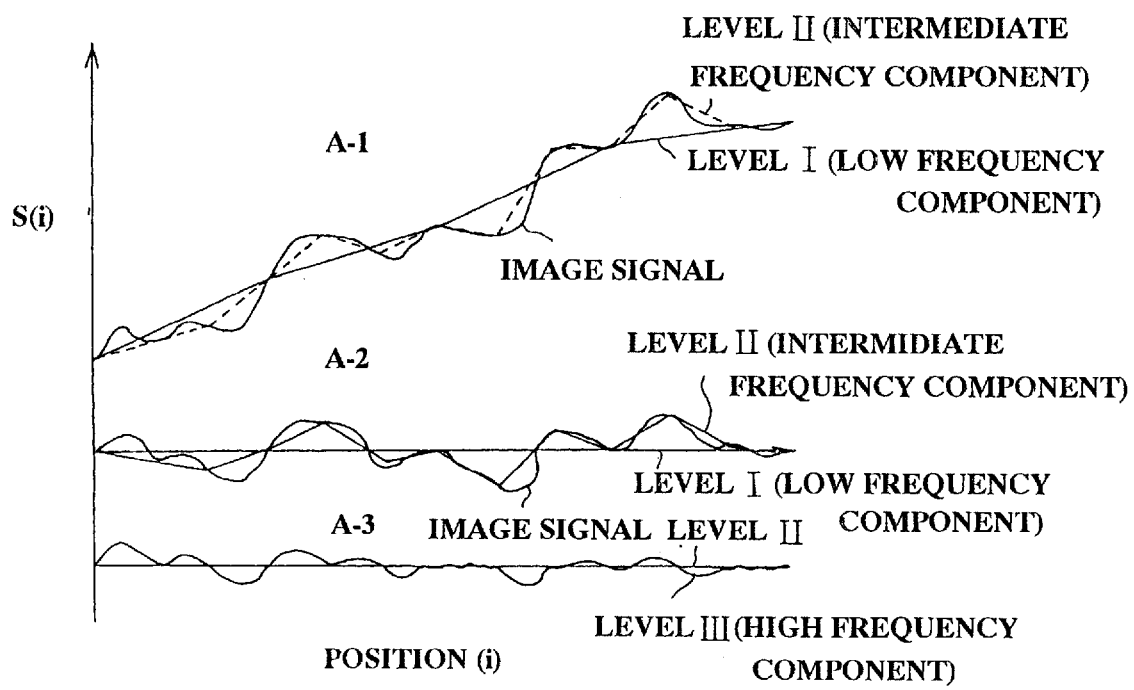
FIGS. 23A and 23B are views given in explanation of the relationship between high frequency components, intermediate frequency components and low frequency components.
Figure 23B:
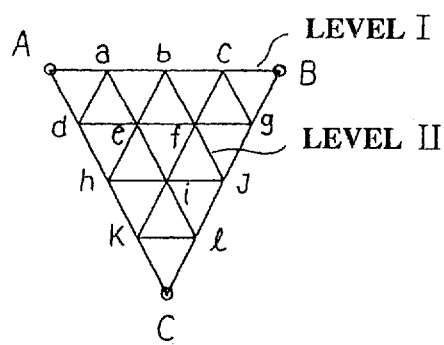

FIG. 23 is a view given in explanation of a method of extracting a low frequency component and intermediate frequency component from the spatial frequency of the original image signal level, by a surface division approximation method. In FIG. 23A, position i is shown on the horizontal axis and the signal levels S(i) of the respective components are shown on the vertical axis. FIG. 23B shows a plane ABC divided into triangles.

Graph A-1 of FIG. 23A shows the image signal and its low frequency component and intermediate frequency component. The signal levels of the low frequency component can be found when the signal levels of the internal pixels have been found by the method of interpolation from the signal levels S(i), of these image signal levels, at the vertices A, B and C. Graph A-2 shows the image signal obtained by removing this low frequency component from the original image signal level. Further, when the signal levels of the internal pixels are found by the interpolation method using as starting points the image signals at even smaller-scale vertices A, B, C, a~1, from which this low frequency component has been removed, the intermediate-component signal level can be found. Graph A-3 is the signal of the high frequency component, obtained by removing the signals of the low frequency component and intermediate frequency component from the original image signal.

Accordingly, in the present invention, the display signal level is calculated by multiplying the low frequency component and intermediate frequency component by weighting coefficients β and γ of less than 1, that may be chosen at will, and adding these to the high frequency components, in order to emphasise the contrast. The display signal DP(j,k) in this case is therefore found by:

$$DP(j,k)=HF(j,k)+\beta LF(j,k)+\gamma MF(j,k).$$

Furthermore, contrast can be raised by using the HP method, HE method or PE method described above (see the above description) to transform the image signal levels in respect of the high frequency component to levels within the display signal level dynamic range. This point has already been described.

FIG. 24 is a view showing a flow chart of image signal processing as described above. The description of the method of image signal processing according to the present invention will now be summarised using this flow chart. In this example, a low frequency component and high frequency component will be employed.

First of all, an original image signal S from an image pick-up camera is written to memory 32 (S1). Then, the entire screen is divided into a large number of triangles (S2). In this division, it is desirable that regions where for example the signal level as described above shows the greatest rate of change should be divided into correspondingly smaller triangles. The original image signal S of the vertices of each triangular surface are then read from memory 32 (S3). This reading action need not be of all the pixels but can be confined just to the pixels corresponding to the vertices. The low frequency components LF of each of the pixels in the interior are then found by interpolation from the original image signal levels at these vertices (S4).

The high frequency components HF at each pixel are then found by a calculation in which the low frequency component LF is subtracted from the original image signal S (S5). Then, a histogram in respect of the high frequency components HF is generated (S6), and a transformation function IHS is generated by for example the HE method (S7). Using this transformation function IHS, the high frequency components HF are transformed to display levels, and a signal DHF is thereby found (S8). The display signal DP is then found by a summation calculation of the transformed high frequency components DHF and a weighted low frequency component βLF (S9). This display signal DP is then written to frame memory 33 (S10), and displayed on the display device (S11).

As described above, with the present invention, a display signal can be generated whereby an original image signal of wide dynamic range picked up from an infrared or X-ray camera can be displayed on a display device of narrow dynamic range, with high contrast. Furthermore, by employing a multi-surface or curved-surface division approximation method to extract the low frequency component, the load of this extraction calculation can be lightened, making it possible to perform the calculation for display signal generation for displaying the image signal fully satisfactorily with a convenient hardware construction.

What is claimed is:

1. An image signal processing method wherein a display signal is generated from an original image signal acquired from means for image pickup, comprising:

a step of dividing a screen into a plurality of polygons, finding signal intensities of pixels in the polygons by interpolation from the original image signal intensities of pixels corresponding to the vertices of these polygons, as a signal intensity of a low frequency component;

a step of finding the signal intensities of high frequency components of the pixels by performing calculation to subtract the signal of the low frequency component from the original image signal at each pixel;

a step of finding the display signal of the pixels by adding to the signal of the high frequency components a signal obtained by multiplying the signal of the low frequency component by a weighting coefficient of less than 1; and a step of displaying image on a display device in accordance with the display signal.

2. Image signal processing method wherein a display signal is generated from an original image signal acquired from means for image pickup, comprising:

a step of dividing a screen into a plurality of polygons, finding signal intensities of pixels in the polygons by interpolation from the original image signal intensities of pixels corresponding to the vertices of these polygons, as a signal intensity of a low frequency component;

a step of finding the signal intensities of high frequency components of the pixels by performing calculation to subtract the signal of this low frequency component from the original image signal at each pixel;

a step of finding, for the signal intensities of the high frequency components, from a histogram showing the rate of occurrence numbers of the respective signal intensities, a transformation function including the integrated values of these rate of occurrence numbers up to the respective signal intensities;

a step of transforming the signal intensities of the high frequency components into display signal intensities in accordance with this transformation function;

a step of finding the display signal of the pixels by adding to the display signals of the high frequency components obtained by the transformation a signal obtained by multiplying the signal of the low frequency component by a weighting coefficient of less than 1; and a step of displaying image on a display device in accordance with the display signal.

3. A method of image signal processing according to claim 1 or 2, wherein when the screen is divided into the plurality of polygons, it is divided into a plurality of triangles.

4. A method of image signal processing according to claim 1 or 2, comprising a step in which the original image signal intensities of the pixels corresponding to the vertices are taken as the mean values of the original image signal intensities of the pixels at the periphery of the aforesaid pixels.

5. A method of image signal processing according to claim 1 or 2, comprising a step of taking the original image signal intensities of the pixels corresponding to the vertices as the mean values of the original image signal intensities in a plurality of frames.

6. A method of image signal processing according to claim 1 or 2, in which the weighting coefficients can be set variably.

7. A method of image signal processing according to claim 2, in which, in the step of finding the transformation function, the rate of occurrence numbers in the respective signal intensities are only integrated up to a prescribed maximum rate of occurrence number.

8. A method of image signal processing according to claim 7, in which the maximum rate of occurrence number can be set variably.

9. A method of image signal processing according to claim 1 or 2, in which, in the step of finding the signal intensity of the high frequency components, for the intermediate signal intensity found by subtracting the signal of the low frequency component from the original image signal, an intermediate frequency component signal of the pixels within these other polygons is generated by interpolation from the vertices of other polygons, which are smaller than the aforementioned polygons, the high-frequency component signal for each pixel is generated by subtracting the low-frequency component signal and the intermediate frequency component signal from the original image signal.

10. An image signal processing device comprising:

image pickup;

an original image signal memory recording an original image signal acquired by the image pickup;

an image signal processing unit generating a display signal by reading the original image signal from the original image signal memory; and a display signal memory recording the display signal generated by the image signal processing unit;

wherein the image signal processing unit has:

a function of dividing the screen into a plurality of polygons and finding a signal intensities of pixels within the polygons by interpolation from the original image signal intensities of the pixels corresponding to the vertices of the polygons, as a signal intensities of a low-frequency component;

a function of finding a signal intensities of a high-frequency components of the pixels by performing calculation to subtract the signals of the low-frequency components from the original image signal at each pixel; and a function of finding the display signal of the pixels by adding to the high-frequency component signal a signal obtained by multiplying the low-frequency component signal by a weighting coefficient of less than 1.

11. An image signal processing device comprising:

image pickup;

an original image signal memory recording an original image signal acquired by the image pickup;

an image signal processing unit generating a display signal by reading the original image signal from the original image signal memory; and a display signal memory recording the display signal generated by the image signal processing unit;

wherein the image signal processing unit has:

a function of dividing the screen into a plurality of polygons and finding a signal intensities of pixels within the polygons by interpolation from the original image signal intensities of the pixels corresponding to the vertices of the polygons, as a signal intensities of a low-frequency component;

a function of finding a signal intensities of the high-frequency components of the pixels by performing calculation to subtract the signals of the low-frequency components from the original image signal at each pixel;

a function of finding, for the signal intensities of the high-frequency components, from a histogram indicating the rate of occurrence numbers of respective signal intensities, a transformation function including the integrated values of these rate of occurrence numbers up to the respective signal intensities;

a function of transforming the signal intensities of the high-frequency components to display signal intensities in accordance with the transformation function; and a function of finding the display signal of the pixels by adding to the display signal of the transformed high-frequency component signal a signal obtained by multiplying the low-frequency component signal by a weighting coefficient of less than 1.

* * * * *